(12) United States Patent
Ishida et al.

(10) Patent No.: US 10,122,465 B2
(45) Date of Patent: Nov. 6, 2018

(54) DIGITAL SIGNAL PROCESSING DEVICE AND OPTICAL TRANSCEIVER APPARATUS

(71) Applicants: NTT ELECTRONICS CORPORATION, Yokohama-shi, Kanagawa (JP); NIPPON TELEGRAPH AND TELEPHONE CORPORATION, Tokyo (JP)

(72) Inventors: Osamu Ishida, Kanagawa (JP); Etsushi Yamazaki, Kanagawa (JP); Kazuhito Takei, Kanagawa (JP); Masahito Tomizawa, Kanagawa (JP); Hideki Nishizawa, Kanagawa (JP)

(73) Assignees: NTT ELECTRONICS CORPORATION, Yokohama (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/575,286

(22) PCT Filed: Sep. 5, 2016

(86) PCT No.: PCT/JP2016/076016
§ 371 (c)(1),
(2) Date: Nov. 17, 2017

(87) PCT Pub. No.: WO2017/047430
PCT Pub. Date: Mar. 23, 2017

(65) Prior Publication Data
US 2018/0152247 A1    May 31, 2018

(30) Foreign Application Priority Data
Sep. 16, 2015  (JP) .................................. 2015-183091

(51) Int. Cl.
*H04B 10/516*    (2013.01)
*H04B 10/50*     (2013.01)
(Continued)

(52) U.S. Cl.
CPC .......... *H04B 10/516* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 9,379,878 B1 * | 6/2016 | Lugthart | ................. | H04L 7/033 |
| 2012/0269510 A1 * | 10/2012 | Hui | .................... | H04Q 11/0005 398/50 |
| 2013/0195452 A1 * | 8/2013 | Hui | ....................... | H04J 14/022 398/50 |
| 2015/0125158 A1 * | 5/2015 | El-Ahmadi | ........... | H04L 1/0057 398/135 |
| 2015/0139649 A1 * | 5/2015 | Kikuchi | .................. | H04J 14/06 398/65 |

FOREIGN PATENT DOCUMENTS

| | | |
|---|---|---|
| JP | 2010-245809 A | 10/2010 |
| WO | WO 2013/012015 A1 | 1/2013 |

OTHER PUBLICATIONS

International Preliminary Report on Patentability of related International Patent Application No. PCT/JP2016/076016 dated Mar. 29, 2018.

(Continued)

*Primary Examiner* — David Payne
*Assistant Examiner* — Omar S Ismail
(74) *Attorney, Agent, or Firm* — Arent Fox LLP

(57) ABSTRACT

Signal processing sections selectively switch modulation/demodulation in low-efficiency modulation system and modulation/demodulation in high-efficiency modulation system, and perform digital signal processing. Parallel-side interfaces of input/output interface sections are electrically connected to the signal processing section. A serial-side (Continued)

interface of the input/output interface section is electrically connected to a serial-side interface of the input/output interface section. A selection section electrically connects a parallel-side interface of the input/output interface section to the signal processing section when the low-efficiency modulation system is selected, and electrically connects the parallel-side interface of the input/output interface section to a parallel-side interface of the input/output interface section when the high-efficiency modulation system is selected.

5 Claims, 13 Drawing Sheets

(51) Int. Cl.
  *H04B 10/60* (2013.01)
  *H04B 10/40* (2013.01)

(56) References Cited

OTHER PUBLICATIONS

Written Opinion of related International Patent Application No. PCT/JP2016/076016 dated Mar. 29, 2018.
Miyamoto, Y., et al. "Ultrahigh-capacity Digital Coherent Optical Transmission Technology" NTT Technical Review, vol. 23, No. 3, pp. 13-18, Mar. 2011.—in Japanese (Corresponds to NPL Ref. 2).
Miyamoto, Y., et al. "Ultrahigh-capacity Digital Coherent Optical Transmission Technology" NTT Technical Review, vol. 9, No. 8, pp. 1-7, Aug. 2011. (Corresponds to NPL Ref. 1).

* cited by examiner

DIGITAL SIGNAL PROCESSING DEVICE AND OPTICAL TRANSCEIVER APPARATUS

CROSS-REFERENCE TO RELATED APPLICATIONS

This application is a National Stage entry of International Application No. PCT/JP2016/076016, filed Sep. 5, 2016, which claims priority to Japanese Patent Application No. 2015-183091, filed Sep. 16, 2015. The disclosures of the priority applications are incorporated in their entirety herein by reference.

FIELD

The present invention relates to a digital signal processing device and an optical transceiver apparatus that make it possible to selectively use an optical transmission application without changing a configuration and a connection form, and to reduce the number of ports of a frame processing section that is connected to a digital signal processing section.

BACKGROUND

Coherent optical transmission technology is a technology in which a receiver includes a local optical oscillator, a beat signal that is generated through interference of received optical signal and local optical signal outputted from the local optical oscillator is converted into a signal of a baseband or an intermediate frequency band, and received equalized waveform is identified and regenerated, as with homodyne detection or heterodyne detection in wireless communication. The coherent optical transmission technology allows for improvement of reception sensitivity, compensation (delay equalization) of static dispersion in an optical fiber, and the like. On the other hand, issues such as synchronization in frequency/phase between the received optical signal and the local optical signal and polarization tracking remain.

A digital coherent optical transmission technology has been developed as a transmission technology that solves the above-described issues to realize transmission capacity higher than 100 Gbit/s per wavelength (for example, refer to NPL 1). In the digital coherent optical transmission technology, optical phase synchronization is performed by digital signal processing, and polarization mode dispersion of the optical fiber and delay characteristics deterioration by chromatic dispersion are adaptively compensated (adaptively equalized) to solve the issues of the conventional coherent optical transmission technology.

The digital coherent optical transmission technology makes it possible to perform flexible signal processing because digital signal processing is used for the above-described electric signal processing. In other words, it is possible to perform various processing such as error correction processing together in addition to the processing such as the optical phase synchronization and adaptive equalization described above. In addition, it becomes possible to use certain processing while determining propriety of the certain processing as necessary. For example, a technology in which one modulation system is optionally selected from different kinds of modulation systems according to instruction from outside has been developed.

A configuration and operation of a conventional optical transceiver apparatus that selects a multilevel modulation system from quadrature phase shift keying (QPSK) of 100 Gbit/s and 16 quadrature amplitude modulation (QAM) of 200 Gbit/s and performs transmission and reception, are described below.

FIG. 11 is a diagram illustrating the conventional optical transceiver apparatus that can optionally select the modulation system. The optical transceiver apparatus includes an optical transmitting section, an optical receiving section, a digital signal processing LSI, a framer LSI, and a frame transfer processing LSI. The optical transmitting section outputs an optical signal that has been modulated by the multilevel modulation system of QPSK or 16QAM. The optical receiving section receives the optical signal that has been modulated by the multilevel modulation of QPSK or 16QAM, and outputs an analog electric signal as a reception signal. The framer LSI performs reconstruction of a frame to be transmitted or received, and conversion of a frame format.

The optical transmitting section receives an electric modulation signal from the digital signal processing LSI, and outputs an optical signal that has been modulated by multilevel modulation system of QPSK or QAM. The optical transmitting section includes a laser diode (LD), a multilevel modulator, and a driver. The LD outputs laser light serving as a carrier wave. The multilevel modulator performs multilevel modulation on the laser light outputted from the LD. The driver drives the multilevel modulator. In a case of the QPSK modulation system of 100 Gbit/s, the optical transmitting section multiplexes input signals of 25 Gbit/s×total four lanes by four-level phase multiplexing (×2) and polarization multiplexing (×2), thereby achieving a transmission rate of 100 Gbit/s per wavelength. In addition, in a case of the 16QAM modulation system of 200 Gbit/s, the optical transmitting section multiplexes input signals of 25 Gbit/s×total eight lanes by 16-level phase multiplexing (×4) and polarization multiplexing (×2), thereby achieving a transmission rate of 200 Gbit/s per wavelength.

The optical receiving section receives the multilevel-modulated optical signal, and outputs an analog electric signal serving as a reception signal. The optical receiving section includes a local optical oscillator (LO), a 90-degree optical hybrid circuit, and a balanced photodetector (PD) array. In a case of the optical receiving section of the QPSK modulation system, the balanced PD array outputs signals of total four lanes (two pairs of IQ signals). In a case of the optical receiving section of the 16QAM modulation system, the balanced PD array outputs signals of total eight lanes (four pairs of IQ signals).

Note that the optical transmitting section and the optical receiving section may be integrally mounted as an optical transceiver in some cases. As the optical transceiver, an analog pluggable form such as CFP2-ACO is also used.

The digital signal processing LSI converts the analog reception signal into a digital signal, and demodulates the reception signal through digital signal processing. Further, the digital signal processing LSI encodes the signal to be transmitted, into a modulated signal corresponding to various kinds of modulation system (QPSK or 16QAM).

The configuration and operation of the digital signal processing LSI are described in detail. The analog reception signal provided from the optical receiving section is converted into a digital signal by an analog-digital (AD) convertor. The digital signal provided from the AD convertor is subjected to chromatic dispersion compensation by a chromatic dispersion compensation section, and is subjected to waveform equalization by an adaptive equalization section, and is then waveform equalized and regenerated by a demodulation section. The chromatic dispersion compensation section compensates chromatic dispersion that is static dispersion of the optical fiber serving as a transmission path. The adaptive equalization section adaptively compensates high-speed waveform deterioration that is mainly caused by polarization fluctuation of the optical signal transmitted through the optical fiber.

These processes are performed by the digital signal processing but it is difficult to serially process the high-speed signal of 25 Gbit/s/lane outputted from the optical receiving section. Therefore, the high-speed signal is typically converted into a parallel signal of about several hundred Mbit/s/lane by the AD convertor, and the digital signal processing is then performed on the parallel signal. The regenerated reception signal is converted into a serial signal of 25 Gbit/s/lane by a parallel-serial convertor of an input/output interface section. The serial signal is then provided as an electric signal of 100 Gbit/s (25 Gbit/s×four lanes), to the framer LSI.

In contrast, a signal to be transmitted (hereinafter, referred to as a transmission signal) that is outputted from the framer LSI is converted, by a serial-parallel convertor of the input/output interface section, into a parallel signal that is suitable for the digital signal processing. The parallel transmission signal is then encoded by a modulation section. The encoded transmission signal is converted, by a digital-analog (DA) convertor, into an analog modulation signal of 25 Gbit/s/lane for driving of the multilevel modulator, and the analog modulation signal is provided to the optical transmitting section.

The chromatic dispersion compensation section, the adaptive equalization section, the demodulation section, and the modulation section described above are collectively referred to as a signal processing section. Note that the signal processing section may further include a function section that performs processing such as error correction processing other than those described above in some cases.

The digital signal processing LSI includes two pairs of input/output interface sections A and B that correspond to two pairs of transmission signals of 100 Gbit/s. When the optical transceiver apparatus transmits and receives an optical signal of 200 Gbit/s modulated by 16QAM, the two pairs of transmission signals of 100 Gbit/s (for example, OTU4) are provided to the signal processing section and are multiplexed.

Note that the function executed by the framer LSI may be mounted on the digital signal processing LSI, as one function of the signal processing section. In this case, the input/output interface sections of FIG. 11 are each directly connected to the frame transfer processing LSI.

Next, a configuration and operation of an optical transceiver apparatus that uses the digital signal processing LSI mounted with both of the QPSK modulation system and the 16QAM modulation system illustrated in FIG. 11 so as to be applicable to both transmission applications of 100 Gbit/s× two wavelengths and 200 Gbit/s×one wavelength, are described with reference to FIGS. 12 and 13.

FIG. 12 is a diagram illustrating a conventional optical transceiver apparatus in a case where each of two optical transceivers transmits and receives an optical signal of a bit rate of 100 Gbit/s by the QPSK modulation system. Optical transceivers 1a and 1b use the optical signals with different wavelengths, which makes it possible to transmit the optical signals of 100 Gbit/s×2 wavelengths=200 Gbit/s by wavelength multiplexing.

The optical transceivers 1a and 1b and the digital signal processing LSIs 2a and 2b in FIG. 12 have configurations same as the respective configurations of the optical transceiver and the digital signal processing LSI illustrated in FIG. 11. A frame processing section 3 includes the framer LSI and the frame transfer processing LSI, and includes at least three ports P1 to P3 that can exchange signals with the input/output interface section provided in each of the digital signal processing LSIs 2a and 2b. Input/output interface sections A and B of the digital signal processing LSI 2a and an input/output interface section C of the digital signal processing LSI 2b are respectively electrically connected to the ports P1 to P3 of the frame processing section 3. Note that, in this example, the input/output interface sections and the ports P1 to P3 of the frame processing section 3 are connected to one another through four lanes in both of transmission and reception.

The optical transceiver 1a transmits and receives the optical signal of 100 Gbit/s that has been modulated by QPSK modulation system. It is sufficient for the digital signal processing LSI 2a to operate only the input/output interface section A as the interface with the frame processing section 3 because the digital signal processing LSI 2a only processes the signal of 100 Gbit/s. Accordingly, the input/output interface section B is electrically connected to the port P2 of the frame processing section 3 for transmission application of 200 Gbit/s×one wavelength described later but does not exchange signal in the transmission of 100 Gbit/s×two wavelengths. Likewise, the optical transceiver 1b transmits and receives the optical signal of 100 Gbit/s that has been modulated by QPSK modulation system. The digital signal processing LSI 2b processes the signal of 100 Gbit/s that is transmitted and received by the optical transceiver 1b, and exchanges the signal with the port P3 of the frame processing section 3 through the input/output interface section C. Operation of the input/output interface section D is unnecessary.

FIG. 13 is a diagram illustrating a conventional optical transceiver apparatus in a case where a single optical transceiver transmits and receives an optical signal at a bit rate of 200 Gbit/s by 16QAM modulation system. The configuration and the connection form of the optical transceiver apparatus are similar to those of the optical transceiver apparatus of FIG. 12 except that not two optical transceivers but one optical transceiver is provided. Since the optical transceiver 1a transmits and receives the optical signal of 200 Gbit/s that has been modulated by 16QAM modulation system, however, it is necessary to operate the two input/output interface sections A and B of the digital signal processing LSI 2a. In addition, the input/output interface sections A and B of the digital signal processing LSI 2a exchange the signal with the ports P1 and P2 of the frame processing section 3, respectively. On the other hand, operation of the digital signal processing LSI 2b is unnecessary. The input/output interface section C of the digital signal processing LSI 2b is electrically connected to the port P3 of the frame processing section 3 but does not exchange a signal.

A tradeoff is present in both of the above-described applications of "transmission of 100 Gbit/s×two wavelengths" by the QPSK modulation system and "transmission of 200 Gbit/s×one wavelength" by the 16QAM modulation system. The 16QAM modulation system is large in data amount (bit number) transmitted and received by one symbol as compared with the QPSK modulation system but is short in transmittable distance as compared with the QPSK modulation system. In other words, in the "transmission of 200 Gbit/s×one wavelength", it is possible to perform optical signal transmission of 200 Gbit/s by one optical transceiver but the transmittable distance is small. On the other hand, in the "transmission of 100 Gbit/s×two wavelengths", it is possible to obtain large transmittable distance but two optical transceivers and two optical wavelength resources are necessary. Each of the optical transceiver apparatuses illustrated in FIGS. 12 and 13 is selectively applicable to one of applications of the "transmission of 100 Gbit/s×two wavelengths" by the QPSK modulation system and the "transmission of 200 Gbit/s×one wavelength" by the 16QAM modulation system, by taking into consideration the characteristics (such as loss and chromatic dispersion) of the optical fiber serving as the transmission medium, a usable wavelength resource, an apparatus cost, and the like.

CITATION LIST

Non Patent Literature

[NPL 1] Yutaka Miyamoto, Akihide Sano, Eiji Yoshida, and Toshikazu Sakano, "Ultrahigh-capacity Digital Coherent Optical Transmission Technology", NTT Technical Journal, Vol. 23, No. 3, pp. 13-18 (March, 2011)

SUMMARY

Technical Problem

Each of the optical transceiver apparatuses of FIGS. 12 and 13 advantageously selectively use both optical transmission applications of the transmission of 100 Gbit/s×two wavelengths and the transmission of 200 Gbit/s×one wavelength (at the total bit rate of 200 Gbit/s in any case) without changing the configuration and the connection form. On the other hand, the digital signal processing LSIs 2a and 2b included in the optical transceiver apparatus are necessarily wired to the port P1 to P3 of the frame processing section 3 at all times. As a result, the ports (three ports) of the frame processing section 3 larger in number than the ports (two ports) that actually exchange signals are disadvantageously occupied at all times. When an optical transmitter in which a wiring with the port P2 is removed is prepared for transmission of 100 Gbit/s×two wavelengths and an optical transmitter in which a wiring with the port P3 is removed is prepared for transmission of 200 Gbit/s×one wavelength, it is possible to cause only the ports of the frame processing section 3 that actually exchange signals, to be occupied even in any optical transmitter as a matter of course. In such a case, however, it is necessary to individually design and develop an optical transmitter according to the optical transmission application, which makes it difficult to reduce the cost of the optical transceiver apparatus by mass production.

The present invention has been made to solve the above-described problems, and an object thereof is to provide a digital signal processing device and an optical transceiver apparatus that make it possible to selectively use an optical transmission application without changing a configuration and a connection form, and to reduce the number of ports of a frame processing section that is connected to a digital signal processing section.

Solution to Problem

A digital signal processing device according to the present invention includes: a first digital signal processing section including a first signal processing section and first and second input/output interface sections; and a second digital signal processing section including a second signal processing section, third and fourth input/output interface sections, and a selection section, wherein the first and second signal processing sections selectively switch modulation/demodulation in low-efficiency modulation system and modulation/demodulation in high-efficiency modulation system which transmits and receives optical signal at a bit rate that is plural times of a bit rate of the low-efficiency modulation system, and perform digital signal processing, the first, second, third, and fourth input/output interface sections mutually convert serial signals and parallel signals, parallel-side interfaces of the first and second input/output interface sections are electrically connected to the first signal processing section, a serial-side interface of the second input/output interface section is electrically connected to a serial-side interface of the fourth input/output interface section, the selection section electrically connects a parallel-side interface of the third input/output interface section to the second signal processing section when the low-efficiency modulation system is selected, and the selection section electrically connects the parallel-side interface of the third input/output interface section to a parallel-side interface of the fourth input/output interface section when the high-efficiency modulation system is selected.

An optical transceiver apparatus according to the present invention includes: a frame processing section including first and second ports; first and second digital signal processing sections receiving signals from the frame processing section to perform digital signal processing on the signals, or outputting signals subjected to the digital signal processing, to the frame processing section; and first and second optical transceivers receiving and converting optical signal into electric signals and providing the electric signals to the first and second digital signal processing sections respectively, or converting electric signals respectively received from the first and second digital signal processing sections, into optical signal, and transmitting the optical signal, wherein the first digital signal processing section includes a first signal processing section and first and second input/output interface sections; and the second digital signal processing section includes a second signal processing section, third and fourth input/output interface sections, and a selection section, the first and second signal processing sections selectively switch modulation/demodulation in low-efficiency modulation system and modulation/demodulation in high-efficiency modulation system which transmits and receives optical signal at a bit rate that is plural times of a bit rate of the low-efficiency modulation system, and perform digital signal processing, the first, second, third, and fourth input/output interface sections mutually convert serial signals and parallel signals, parallel-side interfaces of the first and second input/output interface sections are electrically connected to the first signal processing section, serial-side interfaces of first and third input/output interface sections are electrically connected to the first and second ports of the frame processing section respectively, a serial-side interface of the second input/output interface section is electrically connected to a serial-side interface of the fourth input/output interface section, the selection section electrically connects a parallel-side interface of the third input/output interface section to the second signal processing section when the low-efficiency modulation system is selected, and the selection section electrically connects the parallel-side interface of the third input/output interface section to a parallel-side interface of the fourth input/output interface section when the high-efficiency modulation system is selected.

Advantageous Effects of Invention

The present invention makes it possible to selectively use an optical transmission application without changing a configuration and a connection form, and to reduce the number of ports of a frame processing section that is connected to a digital signal processing section.

DESCRIPTION OF EMBODIMENTS

A digital signal processing device and an optical transceiver apparatus according to the embodiments of the present invention will be described with reference to the drawings. The same components will be denoted by the same symbols, and the repeated description thereof may be omitted.

Embodiment 1

Figure 1:
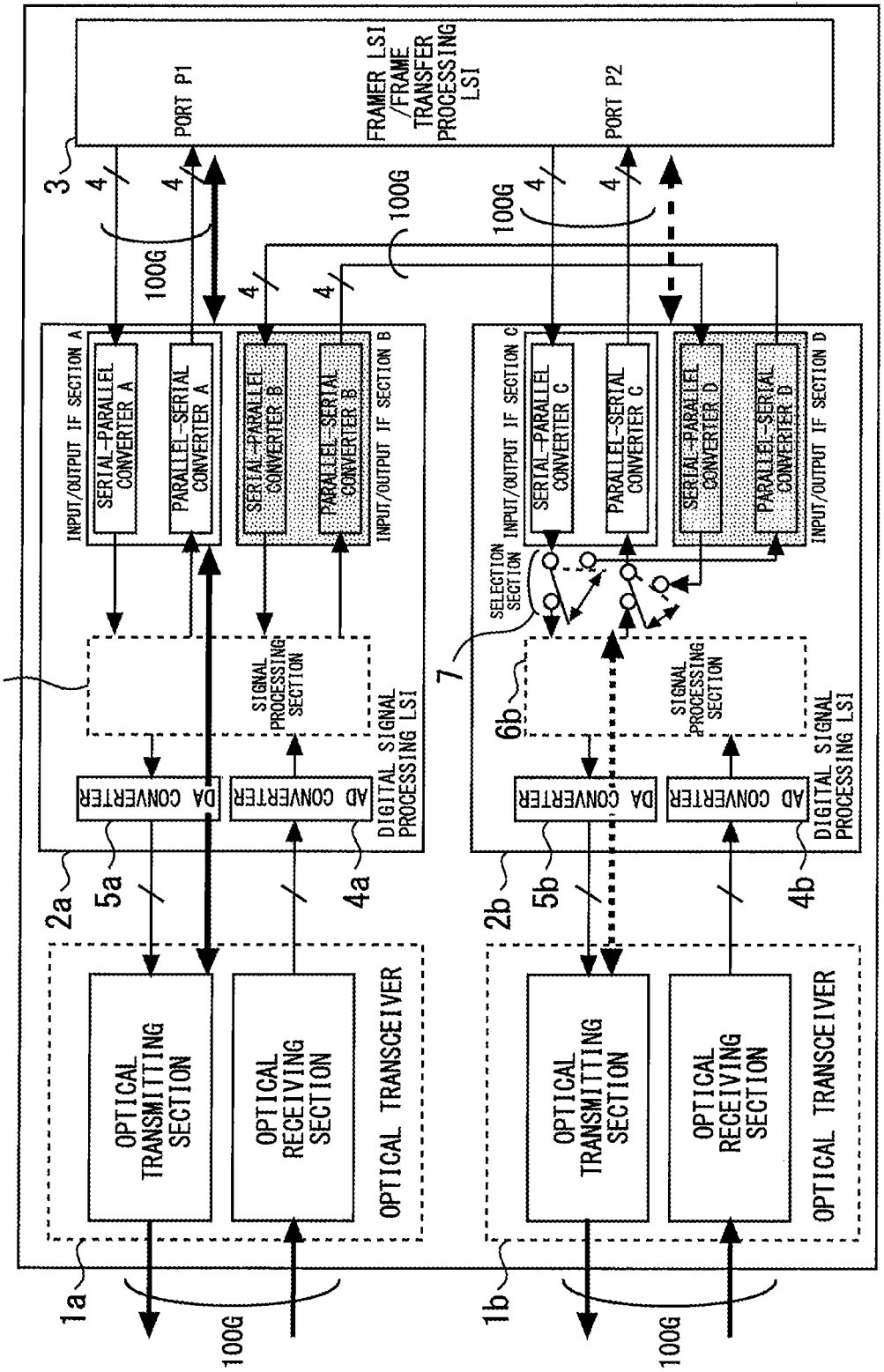
FIG. 1 is a diagram illustrating an optical transceiver apparatus according to Embodiment 1 of the present invention.
Figure 2:
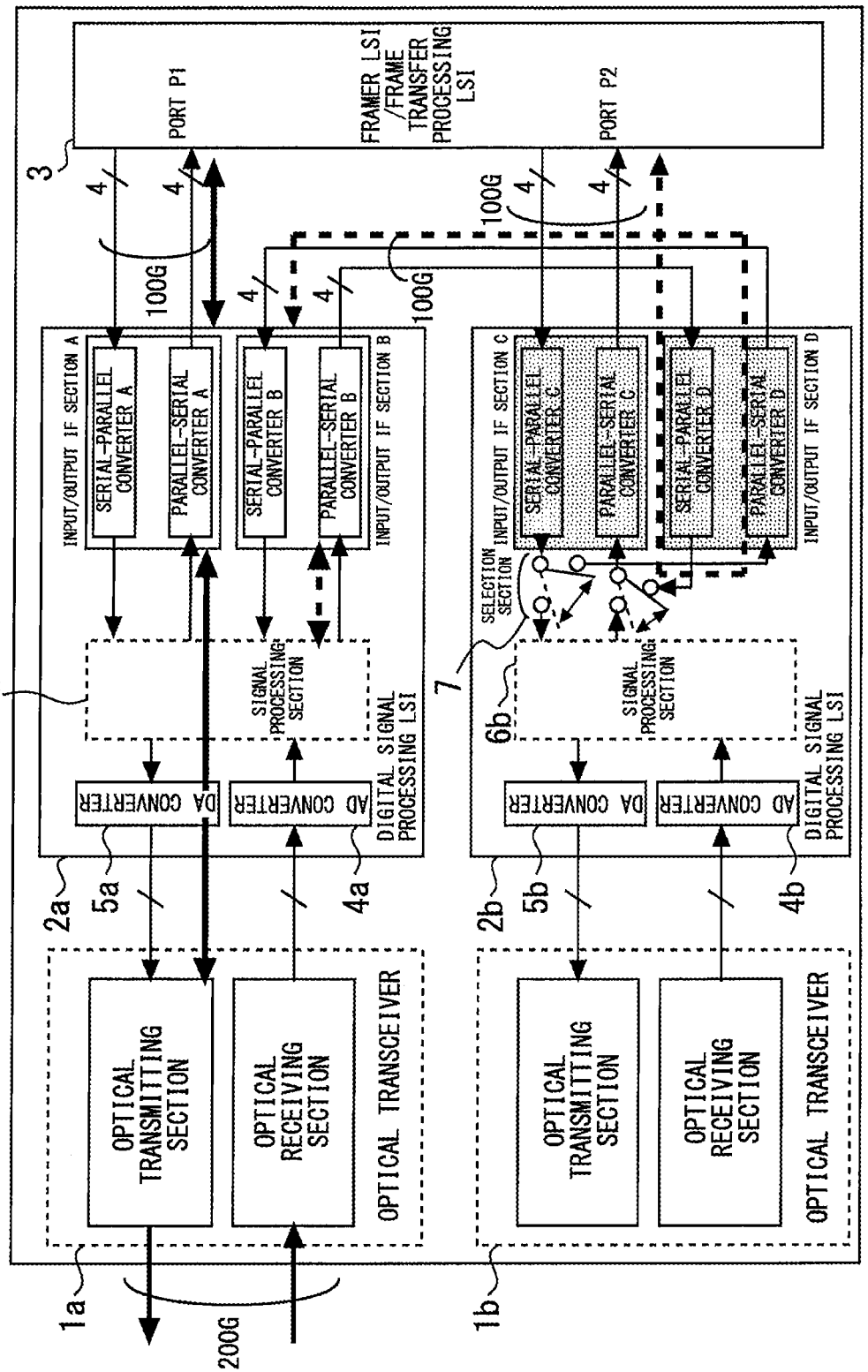
FIG. 2 is a diagram illustrating an optical transceiver apparatus according to Embodiment 1 of the present invention.
Figure 11:
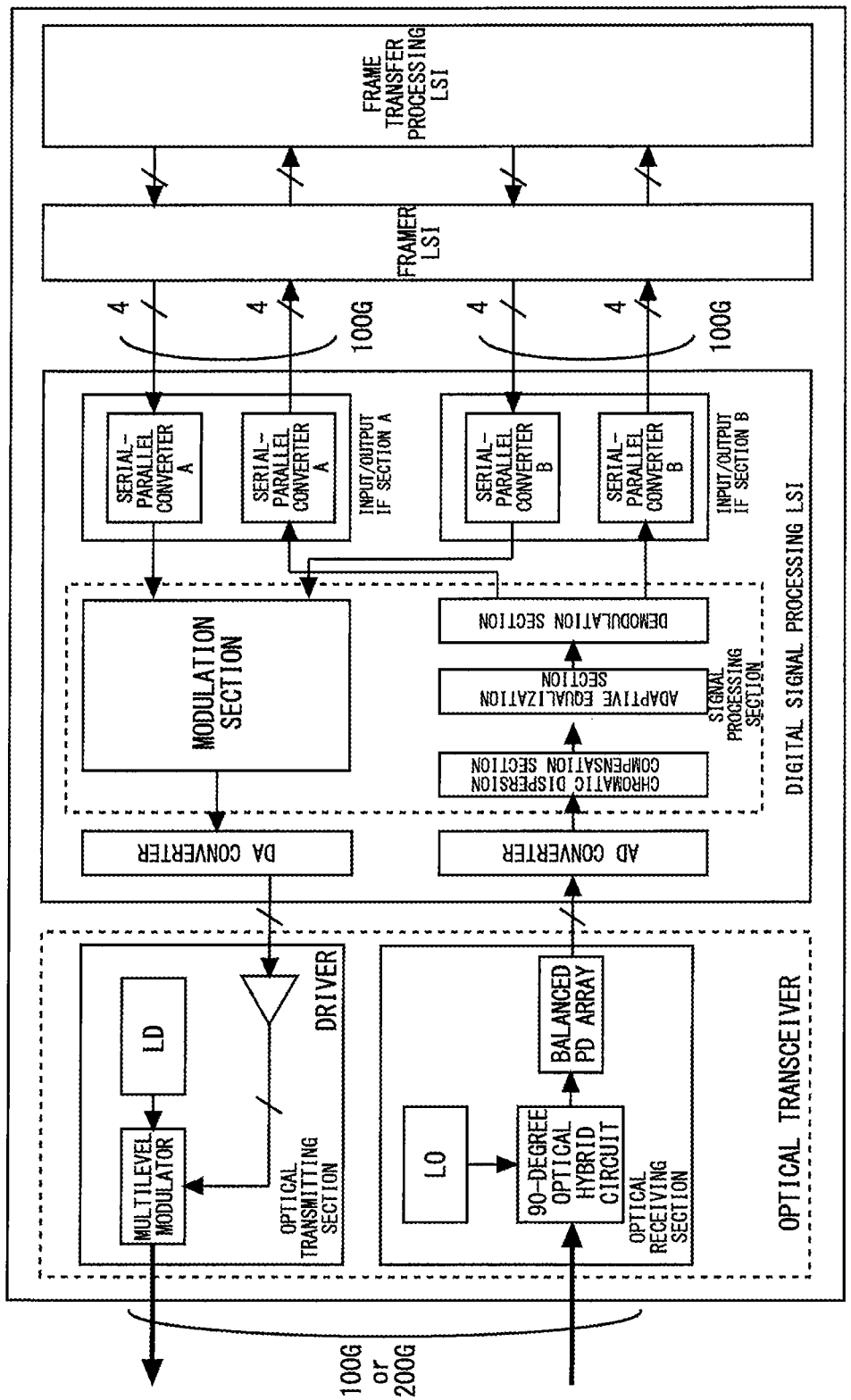
FIG. 11 is a diagram illustrating the conventional optical transceiver apparatus that can optionally select the modulation system.

FIGS. 1 and 2 are diagrams each illustrating an optical transceiver apparatus according to Embodiment 1 of the present invention. Each of optical transceivers 1a and 1b transmits and receives an optical signal. Each of the optical transceivers 1a and 1b includes an optical transmitting section and an optical receiving section. The optical transmitting section outputs an optical signal that has been modulated by the multilevel modulation system of QPSK or 16QAM. The optical receiving section receives the optical signal that has been subjected to the multilevel modulation system of QPSK or 16QAM, and outputs an analog electric signal as a reception signal. The optical transmitting sections and the optical receiving sections of FIGS. 1 and 2 have the configurations same as the respective configurations of the optical transmitting section and the optical receiving section illustrated in FIG. 11.

Each of the digital signal processing LSIs 2a and 2b receives a signal from the frame processing section 3 to perform digital signal processing on the signal, or outputs a signal subjected to the digital signal processing, to the frame processing section 3. The optical transceivers 1a and 1b receive the optical signal, convert the optical signal into electric signals, and respectively provides the electric signals to the digital signal processing LSIs 2a and 2b. Alternatively, the optical transceivers 1a and 1b convert electric signal respectively received from the digital signal processing LSIs 2a and 2b, into an optical signal, and transmit the optical signal.

The frame processing section 3 includes the framer LSI and the frame transfer processing LSI. The framer LSI performs reconstruction of a frame to be transmitted or received, and conversion of a frame format. The frame processing section 3 receives the signals from the digital signal processing LSIs 2a and 2b to perform the frame processing on the signals, or provides frame-processed signals to the digital signal processing LSIs 2a and 2b.

The digital signal processing LSI 2a includes an analog-digital (AD) convertor 4a, a digital-analog (DA) convertor 5a, a signal processing section 6a, and the input/output interface sections A and B. The digital signal processing LSI 2b includes an AD convertor 4b, a DA convertor 5b, a signal processing section 6b, the input/output interface sections C and D, and a selection section 7. Each of the input/output interface sections A to D includes a serial-parallel converter that converts a serial signal into a parallel signal, and a parallel-serial converter that converts a parallel signal into a serial signal.

Each of the signal processing sections 6a and 6b can selectively switch modulation/demodulation in low-efficiency modulation system and modulation/demodulation in high-efficiency modulation system, and perform digital signal processing. The high-efficiency modulation system can transmit and receive an optical signal at a bit rate that is plural times of a bit rate of the low-efficiency modulation system. In the present embodiment, the low-efficiency modulation system is the QPSK modulation system, and the high-efficiency modulation system is the 16QAM modulation system that can transmit and receive an optical signal at a bit rate that is two times the bit rate of the low-efficiency modulation system. The signal processing sections 6a and 6b of FIGS. 1 and 2 each have a configuration similar to the configuration of the signal processing section illustrated in FIG. 11.

Note that the modulation system applicable to the present invention is not limited to the QPSK modulation system and the 16QAM modulation system; however, it is designed for the digital signal processing LSIs 2a and 2b to selectively switch and apply two different modulation systems, and the bit rate of the optical signal that is transmitted and received through a single medium is so set as to be two times different between the both modulation systems. For example, in the present embodiment, the optical signal corresponding to any modulation system is modulated at a symbol rate of 25 G symbol/s. The bit rate is set to 100 Gbit/s in the QPSK modulation system, and is set to 200 Gbit/s in the 16QAM modulation system.

The AD convertors 4a and 4b respectively convert the analog reception signals of 25 Gbit/s/lane that have been outputted from the optical receiving sections of the respective optical transceivers 1a and 1b, into digital signals. The signal processing sections 6a and 6b performs, through the digital signal processing, chromatic dispersion compensation and adaptive equalization on the digital signals that have been provided from the AD convertors 4a and 4b, and then regenerates the reception signals. The parallel-serial convertors of the respective input/output interface sections A to D convert the regenerated reception signals into serial signals of 25 Gbit/s/lane, and provide the serial signals as electric signal of 100 Gbit/s (25 Gbit/s×four lanes) to the frame processing section 3.

The serial-parallel convertors of the respective input/output interface sections A to D convert the signals to be transmitted (hereinafter, referred to as transmission signals) that have been provided from the frame processing section 3, into parallel signals suitable for the digital signal processing. The signal processing sections 6a and 6b encode the parallel signals into modulation signals corresponding to a desired modulation system (QPSK or 16QAM). The DA convertors 5a and 5b convert the encoded transmission signals into analog modulation signals of 25 Gbit/s/lane, and respectively provides the analog modulation signals to the optical transmitting sections of the respective optical transceivers 1a and 1b.

The input/output interface sections A to D exchange the signals with the signal processing sections 6a and 6b and the frame processing section 3, and mutually convert the serial signals and the parallel signals. Therefore, an interface of each of the input/output interface sections A to D for the signal processing sections 6a and 6b is referred to as a "parallel-side interface", and an interface for the frame processing section 3 is referred to as a "serial-side interface".

The parallel-side interface (of each of the serial-parallel converter and the parallel-serial converter) of each of the input/output interface sections A and B of the digital signal processing LSI 2a is electrically connected directly to the signal processing section 6a. The serial-side interface (of each of the serial-parallel converter and the parallel-serial converter) of the input/output interface section A of the digital signal processing LSI 2a is electrically connected to the port P1 of the frame processing section 3. The serial-side interface of the input/output interface section B of the digital signal processing LSI 2a is electrically connected to the serial-side interface of the input/output interface section D of the digital signal processing LSI 2b (more specifically, the serial-side interface of the serial-parallel converter of the input/output interface section B is electrically connected to the serial-side interface of the parallel-serial converter of the input/output interface section D, and the serial-side interface of the parallel-serial converter of the input/output interface section B is electrically connected to the serial-side interface of the serial-parallel converter of the input/output interface section D). The serial-side interface (of each of the serial-parallel converter and the parallel-serial converter) of the input/output interface section C of the digital signal processing LSI 2b is electrically connected to the port P2 of the frame processing section 3.

Inside the digital signal processing LSI 2b, the selection section 7 electrically connects the parallel-side interface of the input/output interface section C to the signal processing section 6b when the low-efficiency modulation system is selected, and the selection section 7 electrically connects the parallel-side interface of the input/output interface section C to the parallel-side interface of the input/output interface section D when the high-efficiency modulation system is selected. More specifically, the selection section 7 electrically connects the parallel-side interface of each of the serial-parallel converter and the parallel-serial converter of the input/output interface section C to the signal processing section 6b when the low-efficiency modulation system is selected. The selection section 7 electrically connects the parallel-side interface of the parallel-serial converter of the input/output interface section C to the parallel-side interface of the parallel-serial converter of the input/output interface section D and electrically connects the parallel-side interface of the parallel-serial converter of the input/output interface section C to the parallel-side interface of the serial-parallel converter of the input/output interface section D when the high-efficiency modulation system is selected.

Next, the operation of the optical transceiver apparatus in a case where the QPSK modulation system is selected by the digital signal processing LSIs 6a and 6b and opposing optical transceiver apparatuses are connected to each other through two media to transmit and receive an optical signal of the bit rate of 100 Gbit/s×two wavelengths, is described with reference to FIG. 1.

Figure 12:
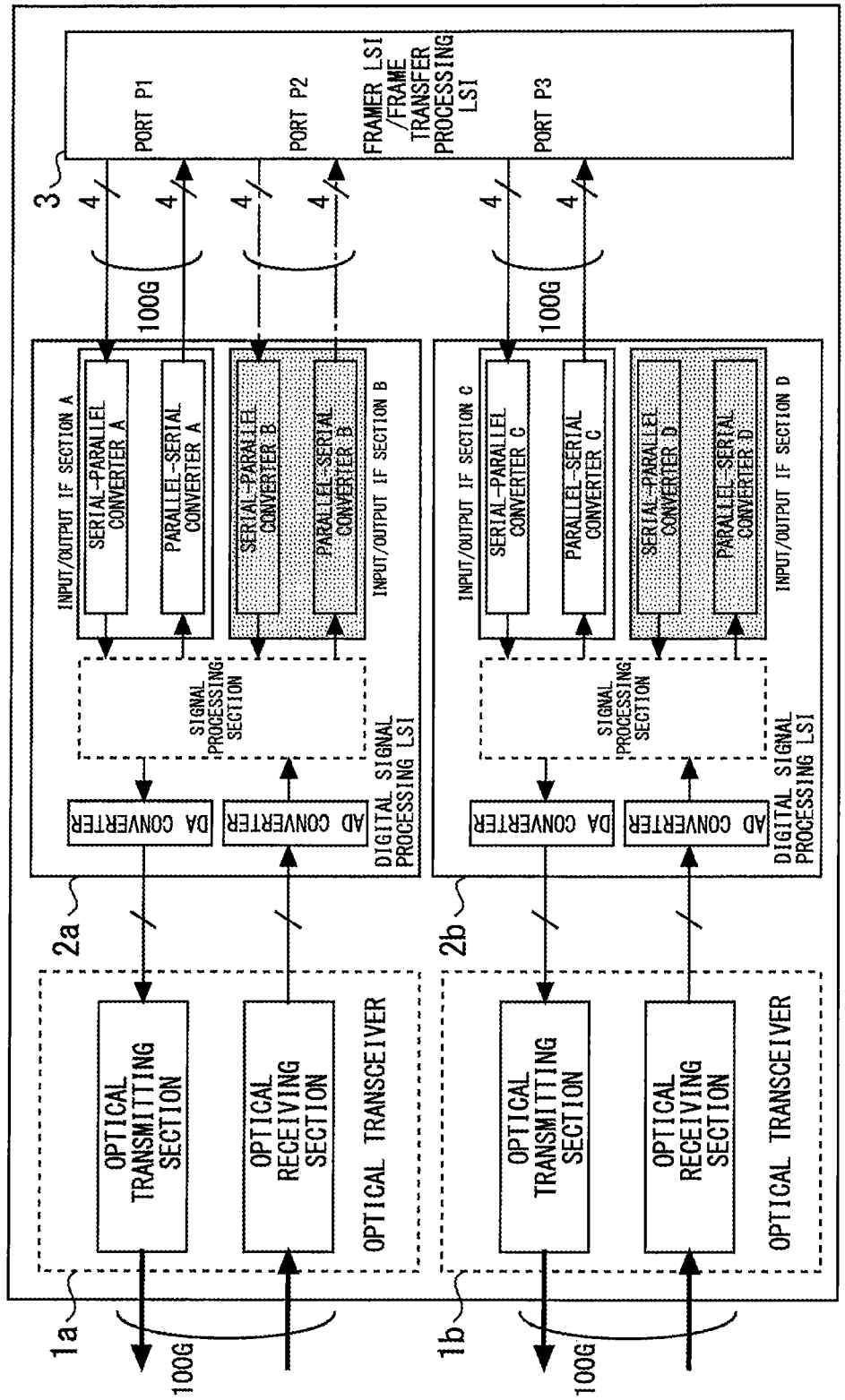
FIG. 12 is a diagram illustrating a conventional optical transceiver apparatus in a case where each of two optical transceivers transmits and receives an optical signal of a bit rate of 100 Gbit/s by the QPSK modulation system.
Figure 13:
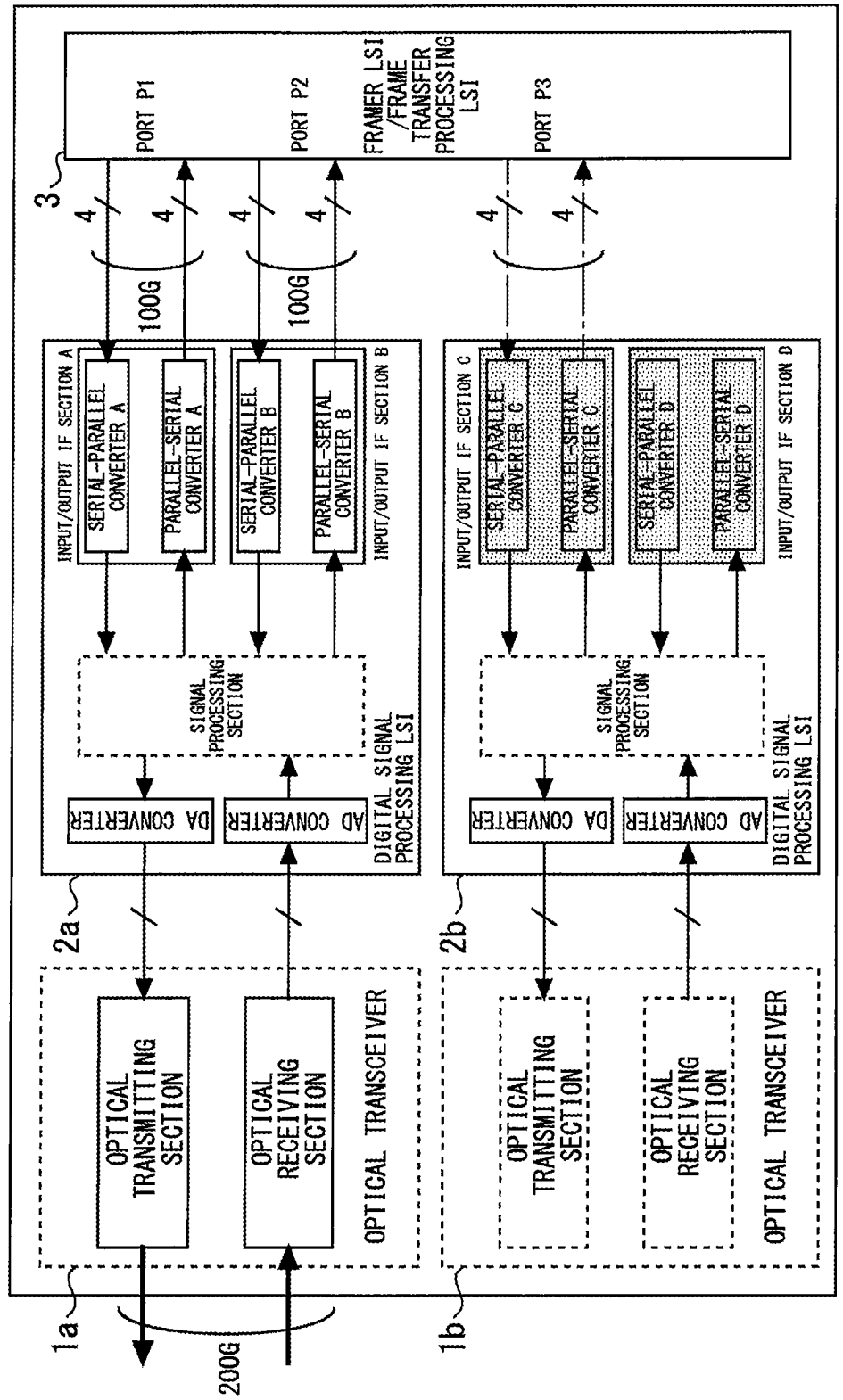
FIG. 13 is a diagram illustrating a conventional optical transceiver apparatus in a case where a single optical transceiver transmits and receives an optical signal at a bit rate of 200 Gbit/s by 16QAM modulation system.

When the QPSK modulation system is selected, the selection section 7 provided in the digital signal processing LSI 2b electrically connects the parallel-side interface of the input/output interface section C to the signal processing section 6b. The QPSK-modulated optical signal that is transmitted and received by the optical transceiver 1a is subjected to the digital signal processing by the signal processing section 6a in the digital signal processing LSI 2a, and the processed optical signal is exchanged with the port P1 of the frame processing section 3 through the input/output interface section A. At this time, the input/output interface section B of the digital signal processing LSI 2a is not operated. Likewise, the QPSK-modulated optical signal that is transmitted and received by the optical transceiver 1b is subjected to the digital signal processing by the signal processing section 6b in the digital signal processing LSI 2b, and the processed optical signal is exchanged with the port P2 of the frame processing section 3 through the selection section 7 and the input/output interface section C. At this time, the input/output interface section D of the digital signal processing LSI 2b is not operated. The operation of the optical transceiver apparatus is same as the operation of the conventional optical transceiver apparatus illustrated in each of FIGS. 12 and 13.

Next, the operation of the optical transceiver apparatus in a case where the 16QAM modulation system is selected by the digital signal processing LSI 2a and opposing optical transceiver apparatuses are connected to each other through one medium to transmit and receive an optical signal of the bit rate of 200 Gbit/s with single wavelength, is described with reference to FIG. 2.

When the 16QAM modulation system is selected, the selection section 7 provided in the digital signal processing LSI 2b electrically connects the parallel-side interface of the input/output interface section C to the parallel-side interface of the input/output interface section D. One of reception signals of 100 Gbit out of the 16QAM-modulated optical signal that are transmitted and received by the optical transceiver 1a is subjected to the digital signal processing by the signal processing section 6a in the digital signal processing LSI 2a, and the processed signal is exchanged with the port P1 of the frame processing section 3 through the input/output interface section A. The other reception signal of 100 Gbit/s is subjected to the digital signal processing by the signal processing section 6a in the digital signal processing LSI 2a, and the processed signal is transmitted to the input/output interface section B. Since the serial-side interface of the input/output interface section B of the digital signal processing LSI 2a is electrically connected to the serial-side interface of the input/output interface section D of the digital signal processing LSI 2b in advance, the signal that is received and transmitted by the input/output interface section B of the digital LSI 2a is exchanged with the port P2 of the frame processing section 3 through the input/output interface section D, the selection section 7, and the input/output interface section C of the digital signal processing LSI 2b.

As mentioned above, the optical transceiver apparatus according to the present embodiment includes the selection section 7 that electrically connects the serial-side interface of the input/output interface section B of the digital signal processing LSI 2a to the serial-side interface of the input/output interface section D of the digital signal processing LSI 2b through wiring, and electrically connects, depending on the selected modulation system, the parallel-side interface of the input/output interface section C of the digital signal processing LSI 2b to one of the signal processing section 6b and the parallel-side interface of the input/output interface section D. This makes it possible to connect the digital signal processing LSIs 2a and 2b to the frame processing section 3 through two ports that is the minimum number of ports. Accordingly, it is possible to selectively use the optical transmission application without changing the configuration and the connection form, and to reduce the number of ports of the frame processing section connected to the digital signal processing section to a bare minimum. As a result, it is possible to provide the optical transceiver apparatus with low cost.

Note that the selection section 7 according to the present embodiment is realized by an FET transistor or the like provided inside the digital signal processing LSI 2b. When a control signal (not illustrated) to select the modulation system is provided from outside of the optical transceiver apparatus, the control signal may be guided by the digital signal processing LSIs 2a and 2b to change the modulation system to the desired system, and the selection section 7 may switch the connection corresponding to the modulation system. To achieve the "connection corresponding to modulation system", the selection section 7 electrically connects the parallel-side interface of the input/output interface section C of the digital signal processing LSI 2b to the parallel-side interface of the input/output interface section D when a higher-efficiency modulation system (such as 16QAM) is selected, and the selection section 7 electrically connects the parallel-side interface of the input/output interface section C of the digital signal processing LSI 2b to the signal processing section 6b when a lower-efficiency modulation system (such as QPSK) is selected.

Figure 3:
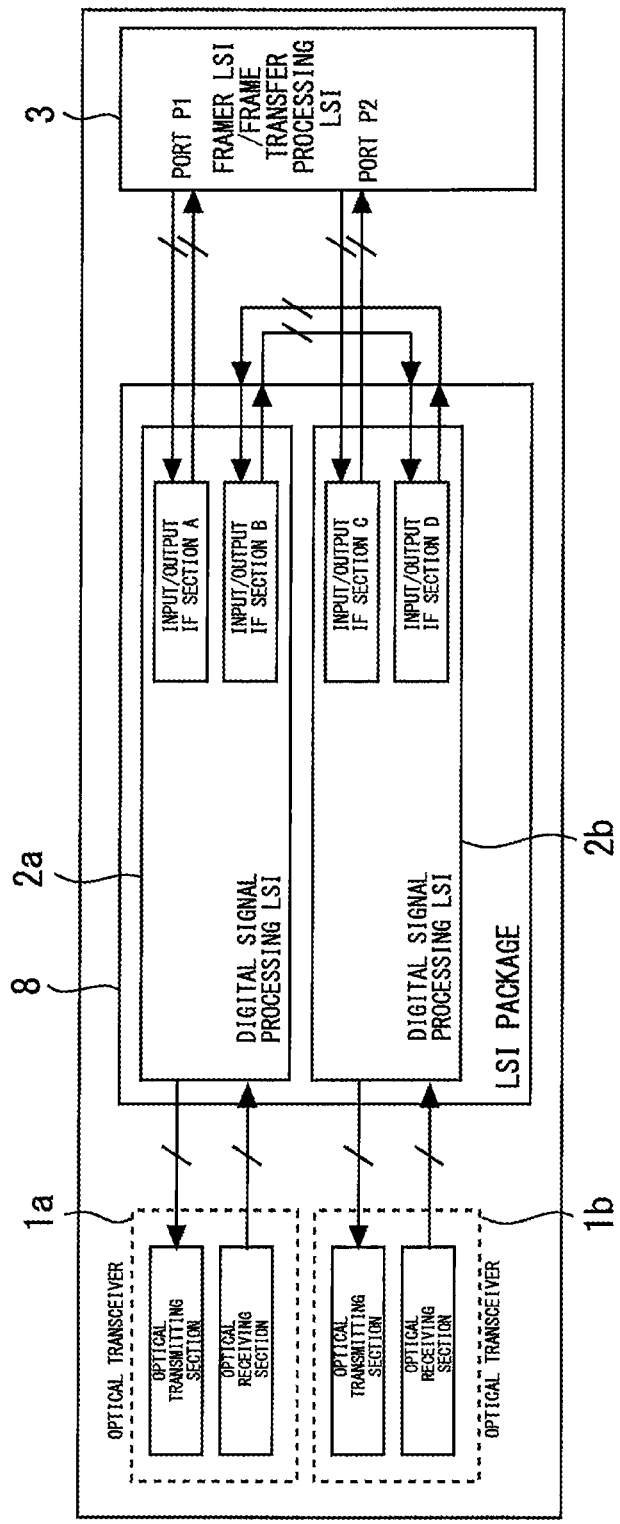
FIG. 3 is a diagram illustrating a mounting example of the optical transceiver apparatus according to Embodiment 1 of the present invention.
Figure 4:
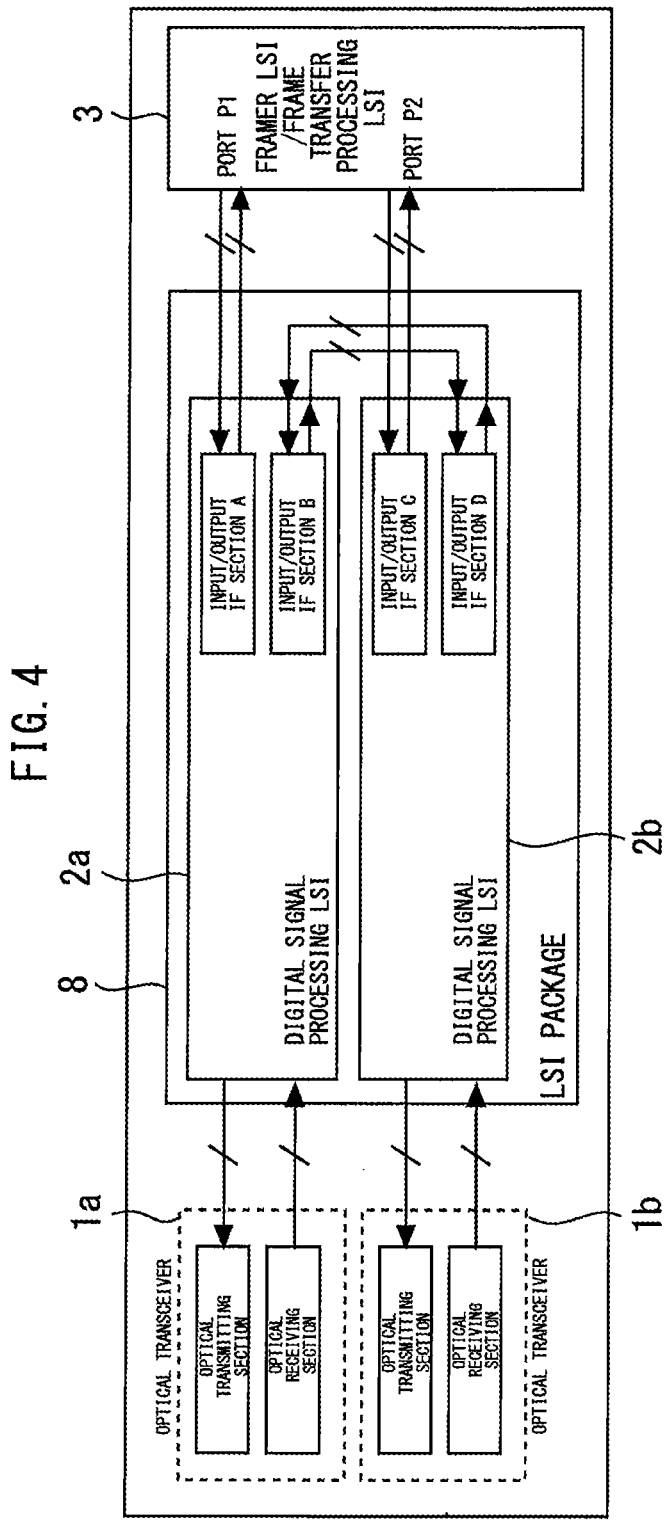
FIG. 4 is a diagram illustrating a mounting example of the optical transceiver apparatus according to Embodiment 1 of the present invention.
Figure 5:
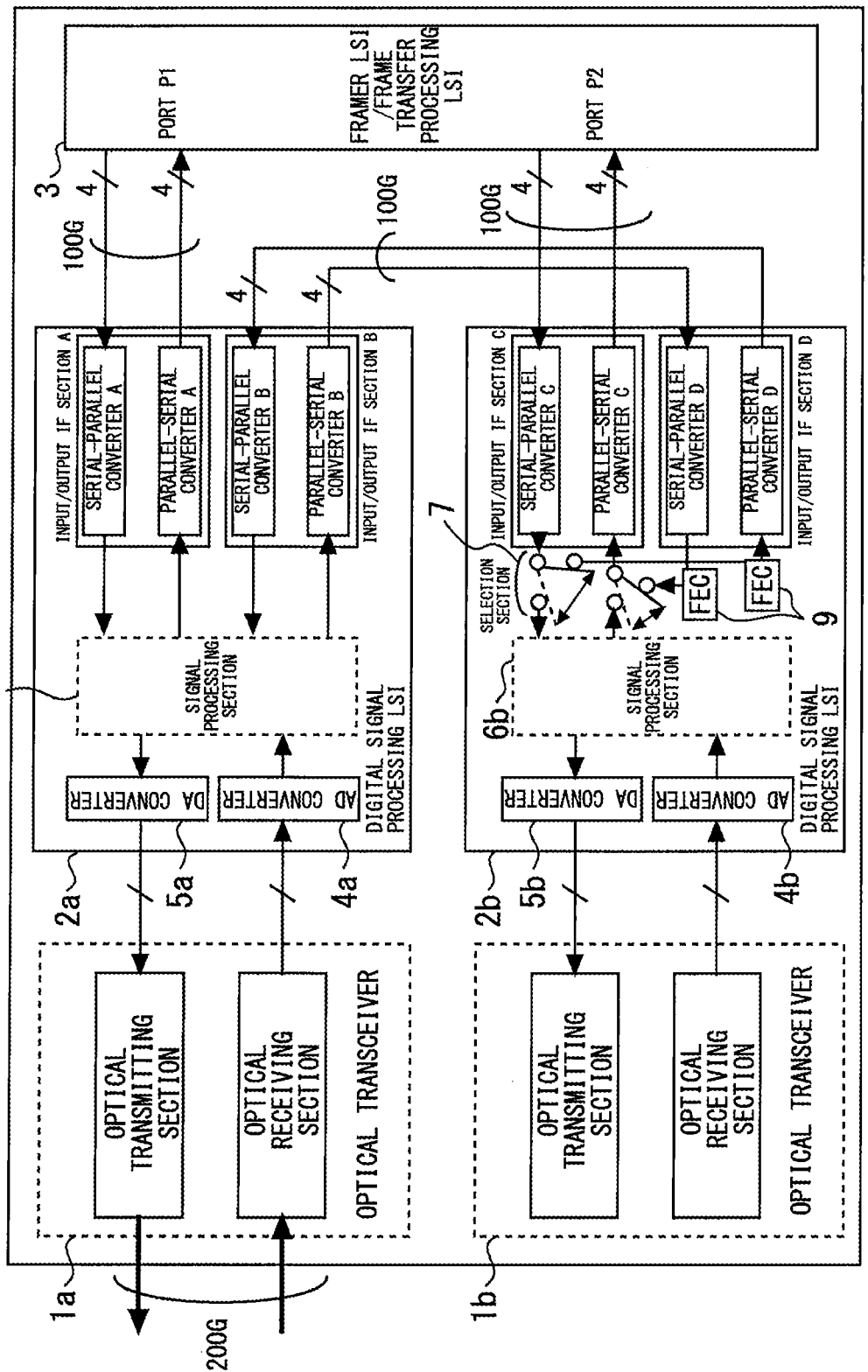
FIG. 5 is a diagram illustrating a mounting example of the optical transceiver apparatus according to Embodiment 1 of the present invention.

FIGS. 3 to 5 are diagrams each illustrating a mounting example of the optical transceiver apparatus according to Embodiment 1 of the present invention. The serial-side interface of the input/output interface section B of the digital signal processing LSI 2a may be electrically connected to the serial-side interface of the input/output interface section D of the digital signal processing LSI 2b through a fixed wiring. Note that, when the two digital signal processing LSIs 2a and 2b are mounted on one LSI package 8, the interfaces may be electrically connected to each other through a wiring of a board that is outside of the LSI package 8 and on which the LSI package 8 is mounted, as illustrated in FIG. 3. Alternatively, as illustrated in FIG. 4, the interfaces may be electrically connected to each other through a wiring inside the LSI package 8. The present invention is not limited by the mounting form of the wiring.

To correct an error that occurs in the serial communication and the serial-parallel conversion between the input/output interface section B of the digital signal processing LSI 2a and the input/output interface section D of the digital signal processing LSI 2b, a forward error correction (FEC) 9 may be preferably applied between the selection section 7 and the input/output interface section B as illustrated in FIG. 5. The present invention is applicable to such a case. The present invention is not limited by presence or absence of an FEC function section in each path of the optical transmitter.

Note that each of the signal processing sections 6a and 6b may include a function section that performs processing such as error correction processing other than those described above. In addition, a function that is executed by the framer LSI may be implemented in each of the signal processing sections 6a and 6b. In this case, each of the digital signal processing LSIs 2a and 2b is directly connected to the frame transfer processing LSI.

Embodiment 2

In Embodiment 1, the optical transceiver apparatus that includes the two digital signal processing LSTs 2a and 2b that respectively include the signal processing sections 6a and 6b is described. The signal processing sections 6a and 6b can selectively switch and perform modulation/demodulation in the low-efficiency modulation system (such as QPSK) and modulation/demodulation in the high-efficiency modulation system (such as 16QAM). The high-efficiency modulation system can transmit and receive an optical signal at a bit rate that is two times of a bit rate of the low-efficiency modulation system. The present invention, however, is not limited to the configuration of Embodiment 1. In the present embodiment, the high-efficiency modulation system (such as 64QAM) can transmit and receive an optical signal at a bit rate that is four times of the low-efficiency modulation system (such as QPSK), and the optical transceiver apparatus includes four digital signal processing LSIs.

Figure 6:
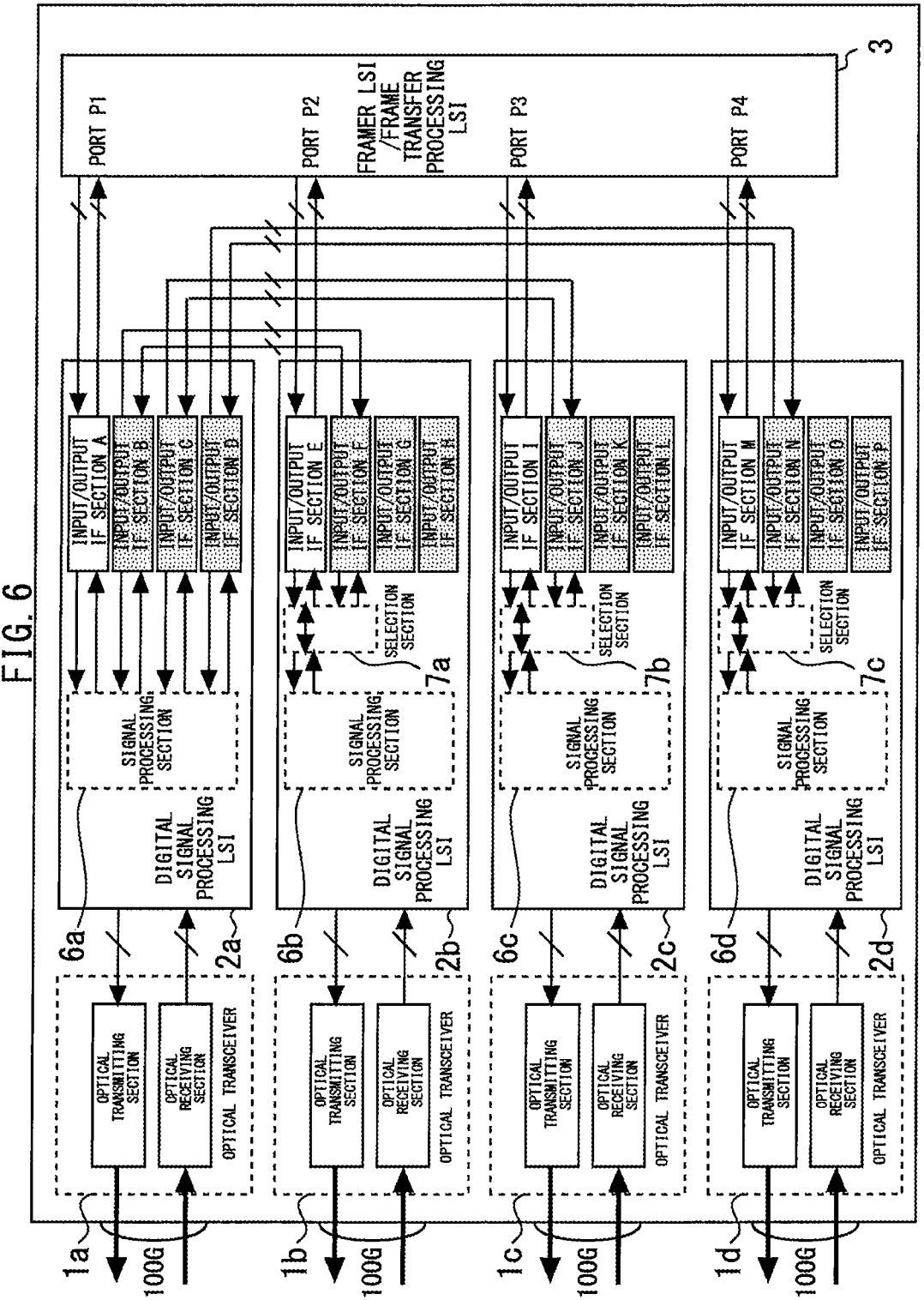
FIG. 6 is a diagram illustrating an optical transceiver apparatus according to Embodiment 2 of the present invention.
Figure 7:
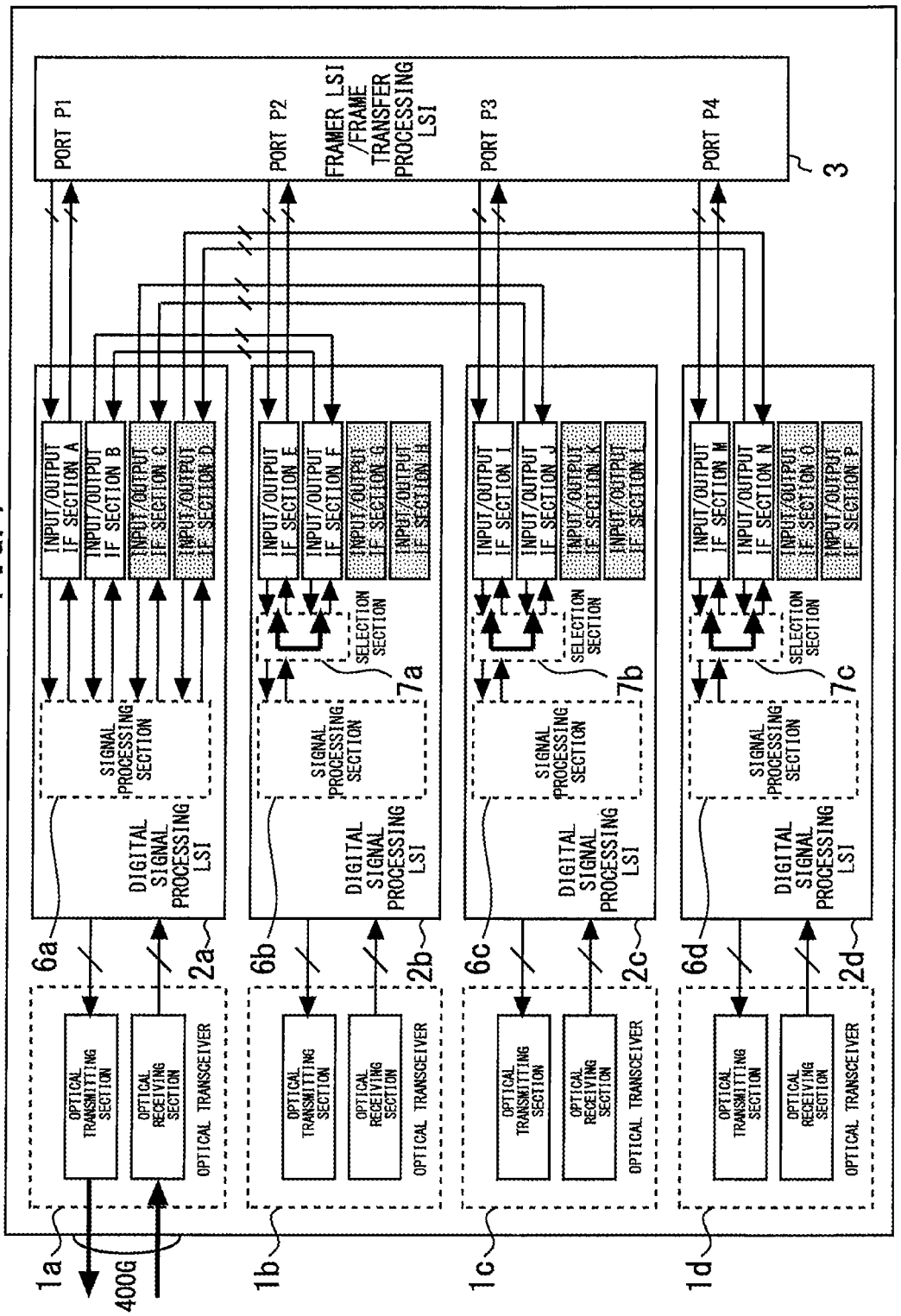
FIG. 7 is a diagram illustrating an optical transceiver apparatus according to Embodiment 2 of the present invention.

FIGS. 6 and 7 are diagrams each illustrating an optical transceiver apparatus according to Embodiment 2 of the present invention. Optical transceivers 1a to 1d, digital signal processing LSIs 2a to 2d, and the frame processing section 3 of the present embodiment have configurations substantially same as the respective configurations of the optical transceivers 1a and 1b, the digital signal processing LSIs 2a and 2b, and the frame processing section 3 of Embodiment 1, except for the following points. Each of the optical transceivers 1a to 1d includes an optical transmitting section that outputs an optical signal modulated by a multilevel modulation system of QPSK (for example, 100 Gbit/s) or 64QAM (for example, 400 Gbit/s), and an optical receiving section that receives the optical signal modulated by the multilevel modulation system of QPSK or 64QAM and outputs an analog reception signal. In addition, each of the digital signal processing LSIs 2a to 2d includes four input/output interface sections in order to output signals that have been multiplexed to the bit rate of 400 Gbit's, as signals of 100 Gbit/s of four channels. Moreover, the digital signal processing LSIs 2b to 2d respectively include selection sections 7a to 7c. The serial-side interfaces of the input/output interface sections A, E, I, and M of the respective digital signal processing LSIs 2a to 2d are electrically connected to the ports P1 to P4 of the frame processing section 3, respectively. The serial-side interfaces of the respective input/output interface sections B, C, and D of the digital signal processing LSI 2a are electrically connected to the serial-side interfaces of the input/output interface sections F, J, and N of the respective digital signal processing LSIs 2b to 2d, respectively. The selection sections 7a to 7c of the respective digital signal processing LSIs 2b to 2d electrically connects the parallel-side interfaces of the respective input/output interface sections E, I, and M to the signal processing sections 6b to 6d or the parallel-side interfaces of the respective input/output interface sections F, J, and N by switching, depending on the selected modulation system.

Next, operation of the optical transceiver apparatus is described. When QPSK (the bit rate of 100 Gbit/s) is selected as the low-efficiency modulation system and an optical transceiver corresponding to the QPSK modulation system is applied to each of the optical transceivers 1a to 1d, the selection sections 7a to 7c of the respective digital signal processing LSIs 2b to 2d electrically connects the parallel-side interfaces of the respective input/output interface sections E, I, and M to the signal processing sections 6b to 6d, respectively, as illustrated in FIG. 6. This causes the optical signals that are respectively transmitted and received by the optical transceivers 1a to 1d to be exchanged with the ports P1 to P4 of the frame processing section 3 through the digital signal processing LSIs 2a to 2d. The optical transceiver apparatus is connected to the opposing optical transceiver apparatus through the four media, and thereby transmitting and receiving the optical signal of the bit rate of 100 Gbit/s×4=400 Gbit/s in the above-described manner.

In contrast, when 64QAM (the bit rate of 400 Gbit's) is selected as the high-efficiency modulation system and an optical transceiver corresponding to the 64QAM modulation system is applied to each of the optical transceivers 1a to 1d, the selection sections 7a to 7c of the respective digital signal processing LSIs 2b to 2d electrically connects the parallel-side interfaces of the respective input/output interface sections E, I, and M to the parallel-side interfaces of the respective input/output interface sections F, J, and N, respectively, as illustrated in FIG. 7. This causes, out of the optical signals that are transmitted and received by the optical transceiver 1a, a signal of 100 Gbit/s in a first channel to be exchanged with the port P1 of the frame processing section 3 through the digital signal processing LSI 2a, signals of 100 Gbit/s in second to fourth channels to be exchanged with the ports P2 to P4 of the frame processing section 3 through the digital processing LSI 2a and the input/output interface sections of the respective digital signal processing LSIs 2b to 2d. The optical transceiver apparatus is connected to the opposing optical transceiver apparatus through one medium, thereby transmitting and receiving the optical signal of the bit rate of 400 Gbit/s.

Note that the present invention is not limited to the configurations including two or four digital signal processing LSIs, described in Embodiment 1 or 2. The present invention is applicable to an optical transceiver apparatus that includes n digital signal processing LSIs. Each of the n digital signal processing LSIs includes a signal processing section that can selectively switch and perform modulation/demodulation in the low-efficiency modulation system and modulation/demodulation in the high-efficiency modulation system. The high-efficiency modulation system can transmit and receive an optical signal at a bit rate that is n times (n is an integer of two or more) of a bit rate of the low-efficiency modulation system. In this case, each of the n digital signal processing LSIs includes a selection section that electrically connects the parallel-side interface of one input/output interface section to the signal processing section or the parallel-side interface of the other input/output interface section by switching, depending on the selected modulation system. A serial-side interface of a first input/output interface section of a first digital signal processing LSI is electrically connected to a first port of a frame processing section. Serial-side interfaces of first input/output interface sections of second to n-th digital signal processing LSIs are electrically connected to second to n-th ports of the frame processing section, respectively. Serial-side interfaces of second to n-th input/output interface sections of the first digital signal processing LSI are electrically connected to serial-side interfaces of the input/output interface sections of the second to n-th digital signal processing LSTs, respectively. When the low-efficiency modulation system is selected, the selection section electrically connects the parallel-side interface of the first input/output interface section to the signal processing section. When the high-efficiency modulation system is selected, the selection section electrically connects the parallel-side interface of the first input/output interface section to any of the parallel-side interfaces of the input/output interface sections electrically connected to the input/output interface section of the first digital signal processing LSI out of the second to n-th input/output interface sections, by switching. This makes it possible to achieve effects similar to those of Embodiments 1 and 2.

Embodiment 3

Figure 8:
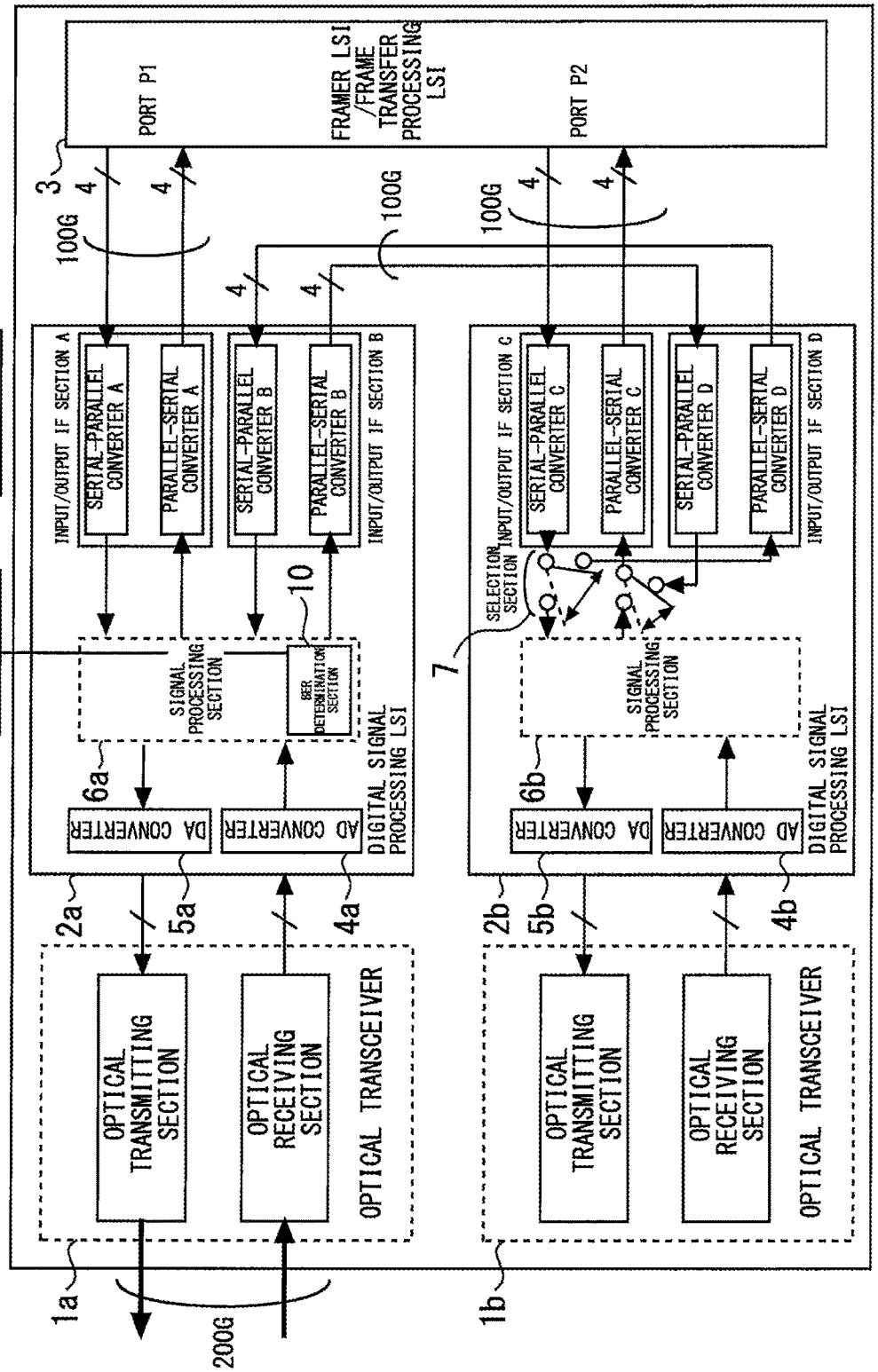
FIG. 8 is a diagram illustrating an optical transceiver apparatus according to Embodiment 3 of the present invention.

FIG. 8 is a diagram illustrating an optical transceiver apparatus according to Embodiment 3 of the present invention. The signal processing section 6a of the digital signal processing LSI 2a is provided with a bit error rate (BER) determination section 10. The BER determination section 10 measures a bit error rate of the optical signal received by the optical transceiver 1a through the medium, and determines whether the measured bit error rate exceeds a desired error rate. In addition, a control section 11 that transmits and receives a control signal to and from the BER determination section 10, and a display section 12 connected to the control section 11 are provided outside the optical transceiver apparatus. Note that the control section 11 or the display section 12 may be incorporated in the optical transceiver apparatus.

A user of the optical transceiver apparatus adopts the optical transceivers 1a and 1b each corresponding to a higher-efficiency modulation system (for example, optical transceivers each corresponding to 16QAM) before starting transmission and reception of the optical signal. Based on instruction from the user, the optical transceiver apparatus transmits and receives the optical signal of 200 Gbit/s with use of one medium. Transmission quality of the optical signal of 200 Gbit/s is evaluated by the BER determination section 10, and a result of the evaluation is displayed on the display section 12. The user refers to the display of the display section 12. When the transmission quality does not satisfy a predetermined standard (the BER exceeds the desired error rate), the user stops the transmission and the reception of the optical signal, and adopts two optical transceivers 1a and 1b each corresponding to a lower-efficiency modulation system (for example, optical transceivers each corresponding to QPSK). Thereafter, the optical transceiver apparatus transmits and receives the optical signal of 100 Gbit/s through two media, based on the instruction from the user.

Providing the BER determination section 10 in the signal processing section 6a of the digital signal processing LSI 2a as described above allows the user of the optical transceiver apparatus to previously easily select the optimal modulation system according to the transmission quality of the optical signal. In addition, when the adaptive optical transceiver in which the modulation system corresponding to the selected modulation system is selectable is used for the optical transceivers 1 and 1b, the optical transceiver apparatus automatically select the optimal modulation system according to the bit error rate (the transmission quality) of the optical signal transmitted through the medium. This makes it possible to reduce operation cost.

Embodiment 4

Figure 9:
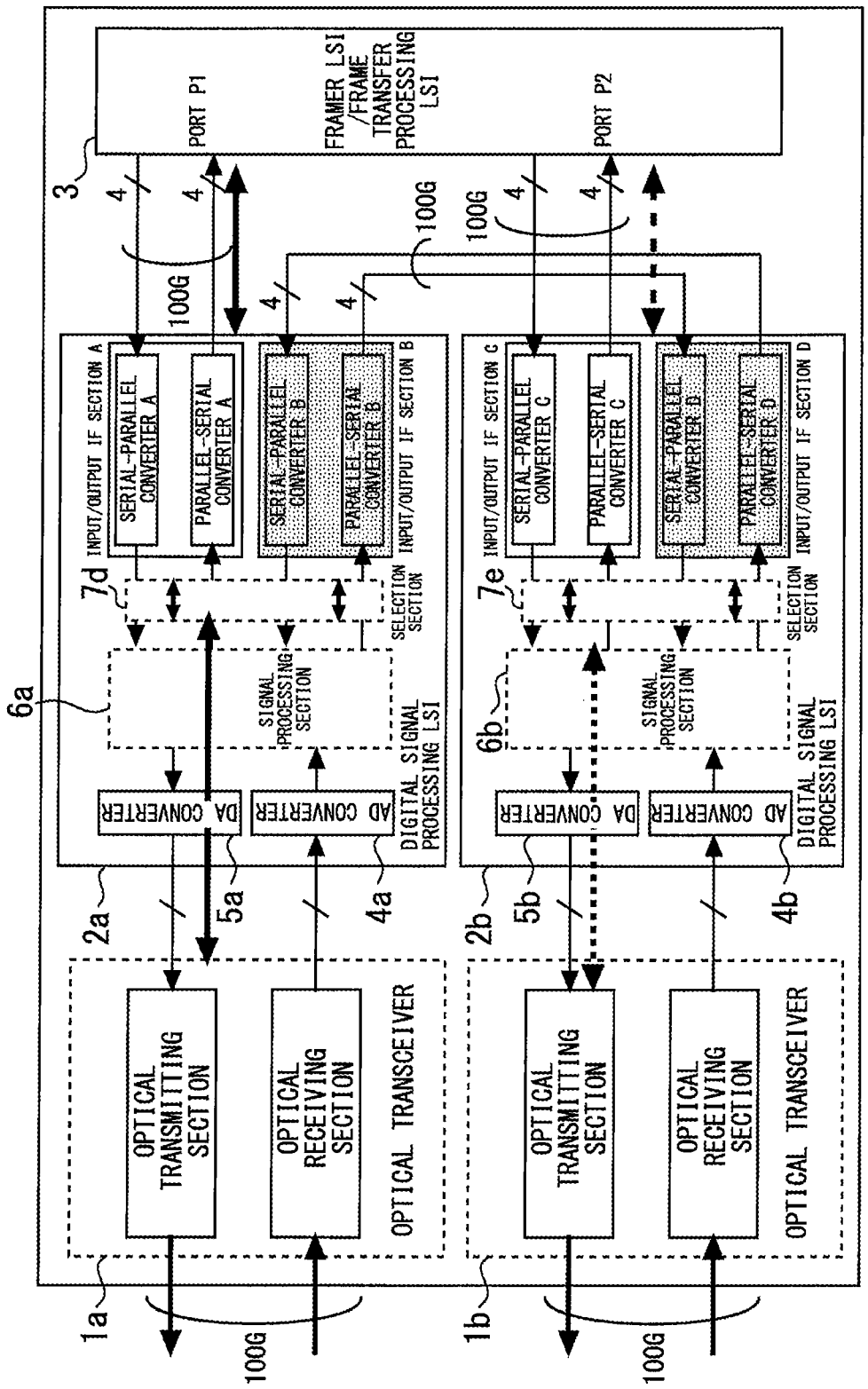
FIG. 9 is a diagram illustrating an optical transceiver apparatus according to Embodiment 4 of the present invention.
Figure 10:
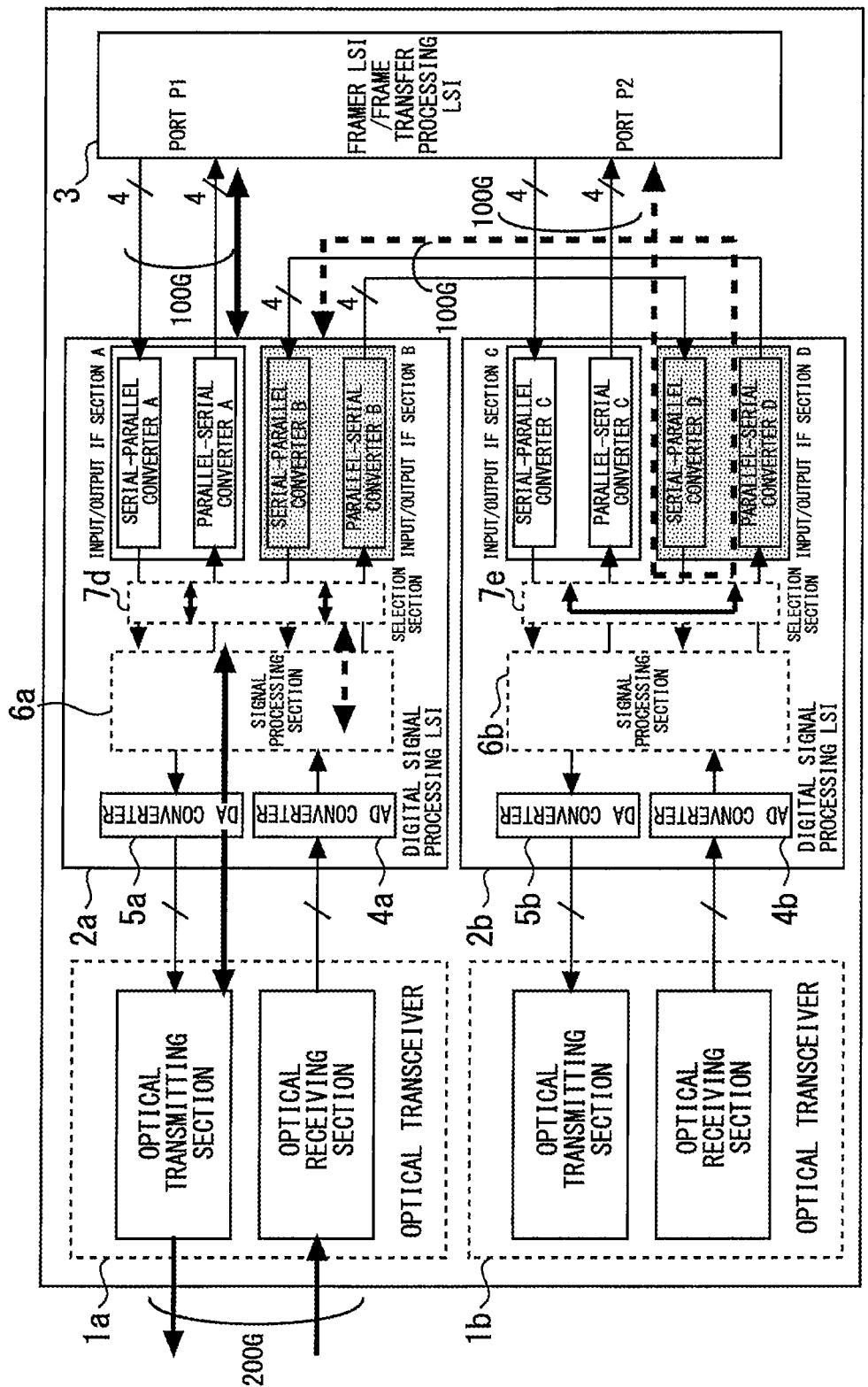
FIG. 10 is a diagram illustrating an optical transceiver apparatus according to Embodiment 4 of the present invention.

FIGS. 9 and 10 are diagrams each illustrating an optical transceiver apparatus according to Embodiment 4 of the present invention. In Embodiment 1, the selection section 7 is provided only in the digital signal processing LSI 2a. In contrast, in the present embodiment, selection sections 7d and 7e both having the same configuration are respectively provided in the digital signal processing LSIs 2a and 2b.

Each of the selection sections 7d and 7e can perform the following two operation.

Operation 1: to electrically connect the parallel-side interfaces of the two input/output interface sections to the signal processing section Operation 2: to electrically connect the parallel-side interfaces of the two input/output interface sections to each other In a case where the optical transceiver apparatus is used in the transmission application of 100 Gbit/s×2 wavelengths by the QPSK modulation system, the selection sections 7d and 7e of the respective digital signal processing LSIs 2a and 2b both perform "Operation 1" as illustrated in FIG. 9. On the other hand, in a case where the optical transceiver apparatus is used in the transmission application of 200 Gbit/s×1 wavelength by the 16QAM modulation system, the selection section 7d of the digital signal processing LSI 2a performs "Operation 1" and the selection section 7e of the digital signal processing LSI 2b performs "Operation 2" as illustrated in FIG. 10. The selection section 7d of the digital signal processing LSI 2a fixedly performs only Operation 1, and does not perform Operation 2. This makes it possible to use digital signal processing LSIs having the same configuration for the digital signal processing LSIs 2a and 2b.

Typically, a huge cost is necessary to develop a system LSI. Therefore, the system LSI is reduced in variety and is mass-produced as much as possible in order to reduce a unit price. In the optical transceiver apparatus according to the present embodiment, since the digital signal processing LSIs 2a and 2b having the same configuration are used, it is possible to prevent the variety of the digital signal processing LSIs from increasing casually. As a result, it is possible to achieve further cost reduction of the digital signal processing LSI or the optical transceiver apparatus.

REFERENCE SIGNS LIST 1a-1d optical transceiver; 2a-2d digital signal processing LSI; 3 frame processing section; 6a-6d signal processing section; 7, 7a-7e selection section; 10 bit error rate determination section; A-P input/output interface section; P1-P4 port

The invention claimed is:

1. A digital signal processing device comprising:
a first digital signal processing section including a first signal processing section and first and second input/output interface sections; and
a second digital signal processing section including a second signal processing section, third and fourth input/output interface sections, and a selection section,
wherein the first and second signal processing sections selectively switch modulation/demodulation in low-efficiency modulation system and modulation/demodulation in high-efficiency modulation system which transmits and receives an optical signal at a bit rate that is plural times of a bit rate of the low-efficiency modulation system, and perform digital signal processing,
the first, second, third, and fourth input/output interface sections mutually convert serial signals and parallel signals,
parallel-side interfaces of the first and second input/output interface sections are electrically connected to the first signal processing section,
a serial-side interface of the second input/output interface section is electrically connected to a serial-side interface of the fourth input/output interface section,
the selection section electrically connects a parallel-side interface of the third input/output interface section to the second signal processing section when the low-efficiency modulation system is selected, and
the selection section electrically connects the parallel-side interface of the third input/output interface section to a parallel-side interface of the fourth input/output interface section when the high-efficiency modulation system is selected.

2. The digital signal processing device according to claim 1, wherein each of the first, second, third, and fourth input/output interface sections includes a serial-parallel converter that converts a serial signal into a parallel signal, and a parallel-serial converter that converts a parallel signal into a serial signal,
parallel-side interfaces of the serial-parallel converters and the parallel-serial converters of the first and second input/output interface sections are electrically connected to the first digital signal processing section,
a serial-side interface of the serial-parallel converter of the second input/output interface section is electrically connected to a serial-side interface of the parallel-serial converter of the fourth input/output interface section,
a serial-side interface of the parallel-serial converter of the second input/output interface section is electrically connected to a serial-side interface of the serial-parallel converter of the fourth input/output interface section,
the selection section electrically connects parallel-side interfaces of the serial-parallel converter and the parallel-serial converter of the third input/output interface section to the second signal processing section when the low-efficiency modulation system is selected, and
the selection section electrically connects a parallel-side interface of the serial-parallel converter of the third input/output interface section to a parallel-side interface of the parallel-serial converter of the fourth input/output interface section and electrically connects a parallel-side interface of the parallel-serial converter of the third input/output interface section to a parallel-side interface of the serial-parallel converter of the fourth input/output interface section when the high-efficiency modulation system is selected.

3. The digital signal processing device according to claim 1, wherein the low-efficiency modulation system is a QPSK modulation system, and the high-efficiency modulation system is a 16QAM modulation system transmitting and receiving an optical signal at a bit rate that is two times the bit rate of the low-efficiency modulation system.

4. The digital signal processing device according to claim 1, wherein the first signal processing section includes a bit error rate determination section measuring a bit error rate of the optical signal received by an optical transceiver and determining whether the measured bit error rate exceeds a desired error rate.

5. An optical transceiver apparatus comprising:
a frame processing section including first and second ports;
first and second digital signal processing sections receiving signals from the frame processing section to perform digital signal processing on the signals, or outputting signals subjected to the digital signal processing, to the frame processing section; and
first and second optical transceivers receiving and converting an optical signal into electric signals and providing the electric signals to the first and second digital signal processing sections respectively, or converting electric signals respectively received from the first and second digital signal processing sections, into an optical signal, and transmitting the optical signal,
wherein the first digital signal processing section includes a first signal processing section and first and second input/output interface sections; and
the second digital signal processing section includes a second signal processing section, third and fourth input/output interface sections, and a selection section,
the first and second signal processing sections selectively switch modulation/demodulation in low-efficiency modulation system and modulation/demodulation in high-efficiency modulation system which transmits and receives an optical signal at a bit rate that is plural times of a bit rate of the low-efficiency modulation system, and perform digital signal processing,
the first, second, third, and fourth input/output interface sections mutually convert serial signals and parallel signals,
parallel-side interfaces of the first and second input/output interface sections are electrically connected to the first signal processing section,
serial-side interfaces of first and third input/output interface sections are electrically connected to the first and second ports of the frame processing section respectively,
a serial-side interface of the second input/output interface section is electrically connected to a serial-side interface of the fourth input/output interface section,
the selection section electrically connects a parallel-side interface of the third input/output interface section to the second signal processing section when the low-efficiency modulation system is selected, and
the selection section electrically connects the parallel-side interface of the third input/output interface section to a parallel-side interface of the fourth input/output interface section when the high-efficiency modulation system is selected.

* * * * *